United States Patent [19]

Bragg

[11] 4,014,557

[45] Mar. 29, 1977

[54] COLUMN PACKING

[75] Inventor: Edward J. Bragg, Somerville, N.J.

[73] Assignee: Metex Corporation, Edison, N.J.

[22] Filed: June 4, 1975

[21] Appl. No.: 583,770

[52] U.S. Cl. .................................. 277/230; 277/1; 277/233; 277/236

[51] Int. Cl.$^2$ ........................................ F16J 15/08

[58] Field of Search ........... 277/230, 233, 204, 236, 277/1; 210/494; 29/163.5 F, 419

[56] References Cited

UNITED STATES PATENTS

| 1,720,384 | 7/1929 | Smith | 210/494 |
|---|---|---|---|
| 2,761,203 | 9/1956 | DeWitt | 277/230 X |
| 2,882,082 | 4/1959 | Poltorak et al. | 277/230 X |
| 2,940,168 | 6/1960 | Monroe | 277/204 X |
| 3,033,722 | 5/1962 | Goodloe | 277/230 X |

Primary Examiner—Richard E. Aegerter
Assistant Examiner—L. Footland
Attorney, Agent, or Firm—Bierman & Bierman

[57] ABSTRACT

Column packing comprising a first layer and a second layer adjacent said first layer, each said layer comprising an inner knitted flattened tubular mesh element formed by inner filaments having 8 to 14 counts per inch, and outer knitted flattened tubular mesh element formed of outer filaments surrounding said inner element and in contact therewith and having 4½ to 6½ counts per inch, the axes of said inner element and said outer element being substantially parallel or coincident, at least one of said layers being crimped in wave form, the crests of said waves being at an angle of 20° to 45° to a line perpendicular to said axes, a surface of said first layer being generally in contact with a surface of said second layer, the diameter of said inner filaments being from 29 to 75% of the diameter of said outer filaments.

6 Claims, 6 Drawing Figures

COLUMN PACKING

The present invention is directed to a new and improved form of column packing useful in such fields as distillation, stripping, absorption and a liquid-liquid extraction processes as well as for other mass transfer operations and related processes.

The basic invention consists of the use of layers of knitted sleeve mesh wound together to form a cartridge or, preferably, disposed in parallel layers to fit the inside configuration of an appropriate vessel.

In its most preferred and simplest form, the packing comprises a first and a second layer. Each layer consists of two flattened tubular elements made of knitted mesh, preferably of wire. The inner element is composed of wire mesh having 8 to 14 counts per inch while the outer element has 4½ to 6½ counts per inch. The axes of the inner and outer elements are substantially parallel or coincident, and the inner surface of the outer element lays generally over and in contact with the outer surface of the inner element. At least one of the layers is crimped, preferably in a wave form with the crests of the waves being at an angle of 20° to 45° to a line perpendicular to the axes.

The diameters of the filaments making up the inner element are from 29 to 75% of the diameters of the filaments making up the outer element.

It is most preferably that both the first layer and the second layer are crimped. In such case it is desirable that the crests of the waves on the first layer be opposed to and in contact with the crests on the second layer.

The double layer packing according to the present invention is produced by knitting a first inner mesh element of generally tubular form followed by knitting a first outer mesh element around the first inner element. When this is done, the two elements will generally be in contact with each other at their adjoining surfaces. The first inner element will have 8 to 14 counts per inch and the first outer element will have 4½ to 6½ counts per inch. The two together form the first layer.

The second layer is formed in the same manner as the first layer from filaments and knitted mesh having the same characteristics as corresponding portions of the first layer. At least one, and preferably both, of the first layer and the second layer are crimped in a wave form with the crests of the waves being at an angle of 20° to 45° to a line perpendicular to the axes of the tubular form. The second layer is then placed adjacent the first layer and in contact therewith so that the crests of the waves formed on the respective layers are opposed to and in contact with each other. The diameters of the inner filaments are from 29 to 75% of the diameters of the outer filaments.

In the accompanying drawings constituting a part hereof and in which like reference characters indicate like parts;

FIG. 5 is a schematic view of a laminated form of the invention; and

FIG. 6 is a schematic view of a spirally wound form of the invention.

Figure 1:
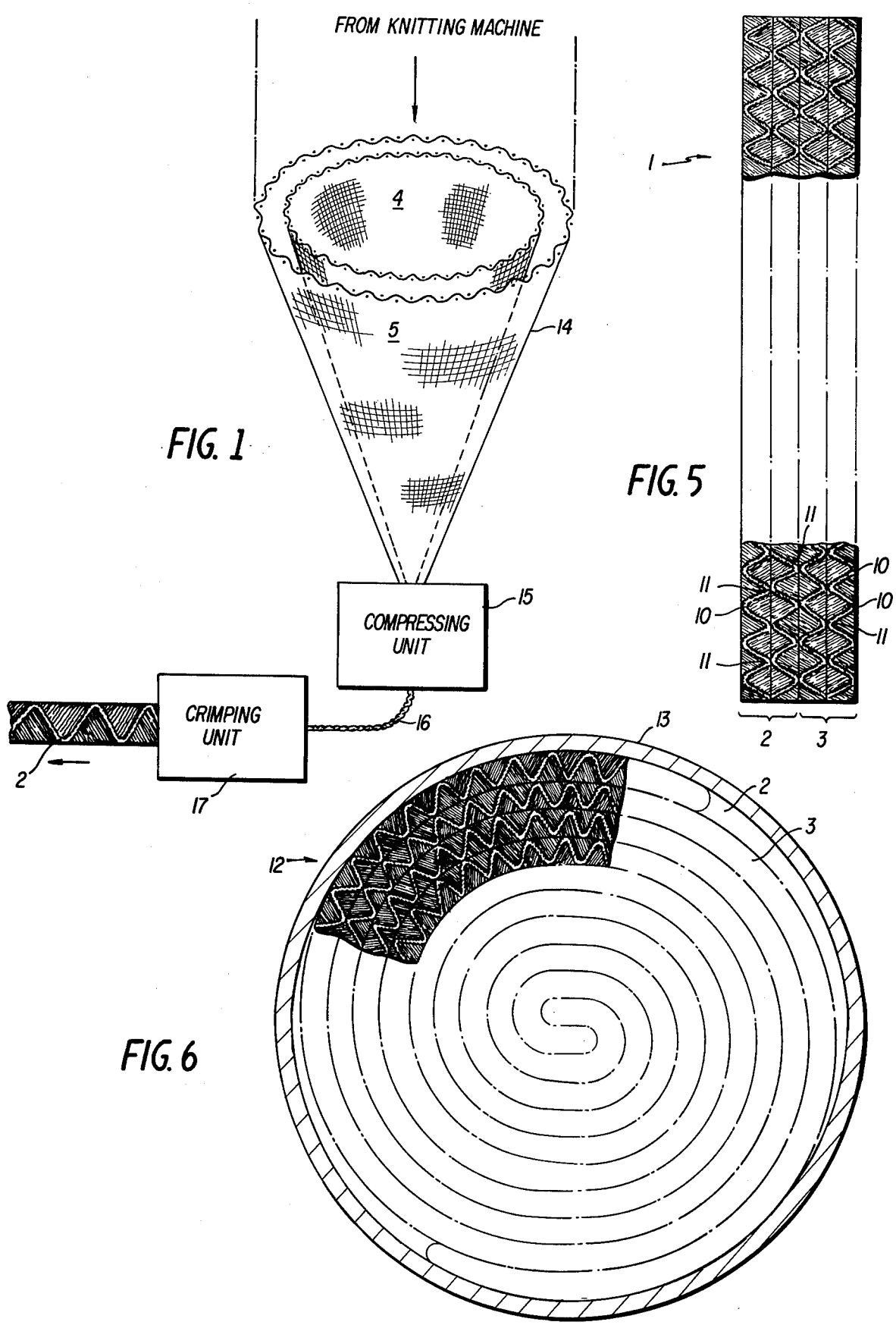
FIG. 1 is a diagrammatic view showing the method of compressing and crimping a layer.

The packing material is made up of a first layer 2 and a second layer 3 which are, in the preferred form of the invention, tubular in shape. First layer 2 is composed of first inner element 4 and first outer element 5. Second layer 3 is composed of second inner element 6 and second outer element 7. The inner elements are preferably made of inner filaments 8 and the outer elements are preferably made of outer filaments 9.

Figure 2:
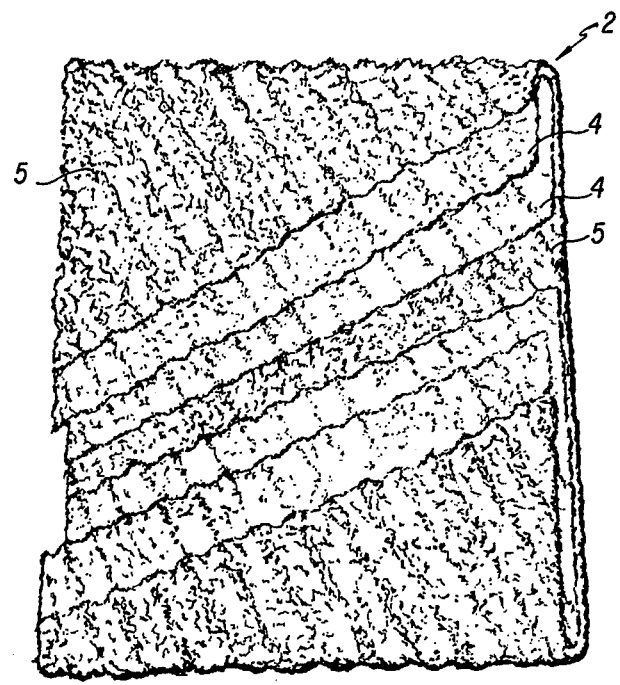
FIG. 2 is a view showing a part of the first layer with portions of the tubular elements broken away.
Figure 3:
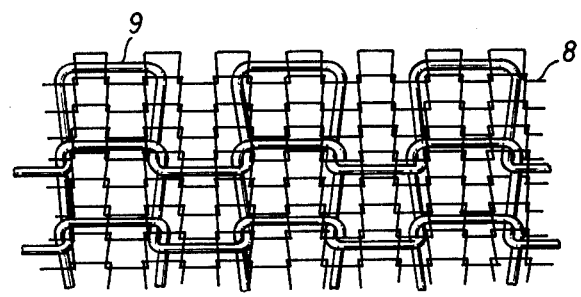
FIG. 3 is an enlarged view of a portion of the tubular element of FIG. 2.

The diameters of the inner filaments 8 are from 29 to 75% of the diameters of outer filaments 9. As shown in FIG. 2, the inner and outer layers are crimped in the form of waves 10 with crests 11 at an angle of 20° to 45° to a line perpendicular to the axes of elements 4 and 5.

Figure 4:
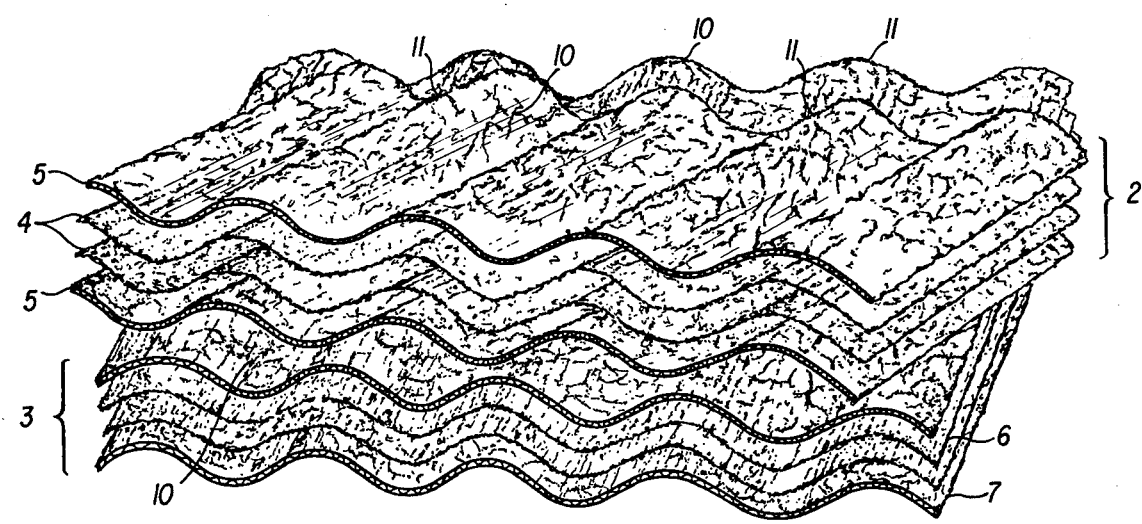
FIG. 4 is a fragmentary enlarged exploded view of two elements of FIG. 2 superimposed on each other.

In a preferred form of the invention, layers 2 and 3 are each crimped in the form of waves 10. Crest 11 of the waves are at angles to each other so that the crests contact one another and aid in spacing apart the two layers. This is shown in FIG. 4.

In one modification of the invention, layers 2 and 3 after crimping, are placed adjacent one another to form laminated unit 1 as shown in FIG. 5. As an alternative to this, layers 2 and 3 are wound to form spiral unit 12 (see FIG. 6). Most preferably, spiral unit 12 is contained by pipe 13 thereby giving added strength to the unit. In the case of a cylindrical column, the column wall itself can take the place of pipe 13.

The packing according to the present invention, is manufactured substantially on existing equipment and in generally known manner. The manufacturing process will be described as to layer 2 only, but it is understood that the same process is applicable to layer 3.

Referring more particularly to FIG. 1, inner element 4 is first made on a standard tubular knitting machine (not shown) then drawn through a second tubular knitting machine (also not shown). In the second machine, outer element 5 is made around element 4 forming cone 14 which leads into compressing unit 15. Unit 15 flattens cone 14 to produce form 16 which is then fed through printing unit 17 which produces layer 2 (see FIG. 2). Layer 2 is the basic unit from which the packing of the present invention is made.

The depth of the crimp can be varied widely depending upon the characteristics desired. It has been found that a deeper crimp increases the throughput and decreases the amount of liquid held up by the packing. If the crimp is made shallower, the amount of holdup is increased and the throughput is reduced. Alternatively, the inner elements can be made of multi-knitted material; knitted of a plurality of wires at the same time. Such structure increases the holdup without excessive reduction in throughput.

While only a limited number of specific embodiments of this invention have been described, such changes as should be apparent to those having ordinary skill in the art may be made without departing from the scope or spirit thereof. The invention is to broadly construed, and not to be limited except by the character of the claims appending hereto.

What is claimed is:

1. Column packing comprising a first layer and a second layer adjacent said first layer, each said layer comprising an inner knitted flattened tubular mesh element formed of inner filaments and having 8 to 14 counts per inch, an outer knitted flattened tubular mesh element formed of outer filaments, surrounding said inner element and in contact therewith and having 4½ to 6½ counts per inch, the axes of said inner element and said outer element being substantially parallel or coincident, at least one of said layers being crimped in wave form, the crests of said waves being at an angle of 20° to 45° to a line perpendicular to said axes, a surface of said first layer being generally in contact with a surface of said second layer, the diameter of said inner filaments being from 29 to 75% of the diameter of said outer filaments.

2. Packing according to claim 1 wherein said filaments are wire.

3. Packing according to claim 2 wherein both said first layer and said second layer are crimped, the crests on said first layer being opposed to and in contact with the crests on said second layer.

4. Packing according to claim 3 wherein said layers are rolled together in a spiral.

5. Packing according to claim 3 comprising a plurality of alternating first and second layers.

6. Packing according to claim 1 wherein said inner element is multi-knitted of a plurality of said inner filaments.

* * * * *